May 3, 1932. E. A. BROKAW ET AL 1,856,535
CASTER STEM AND SOCKET
Filed Nov. 15, 1929
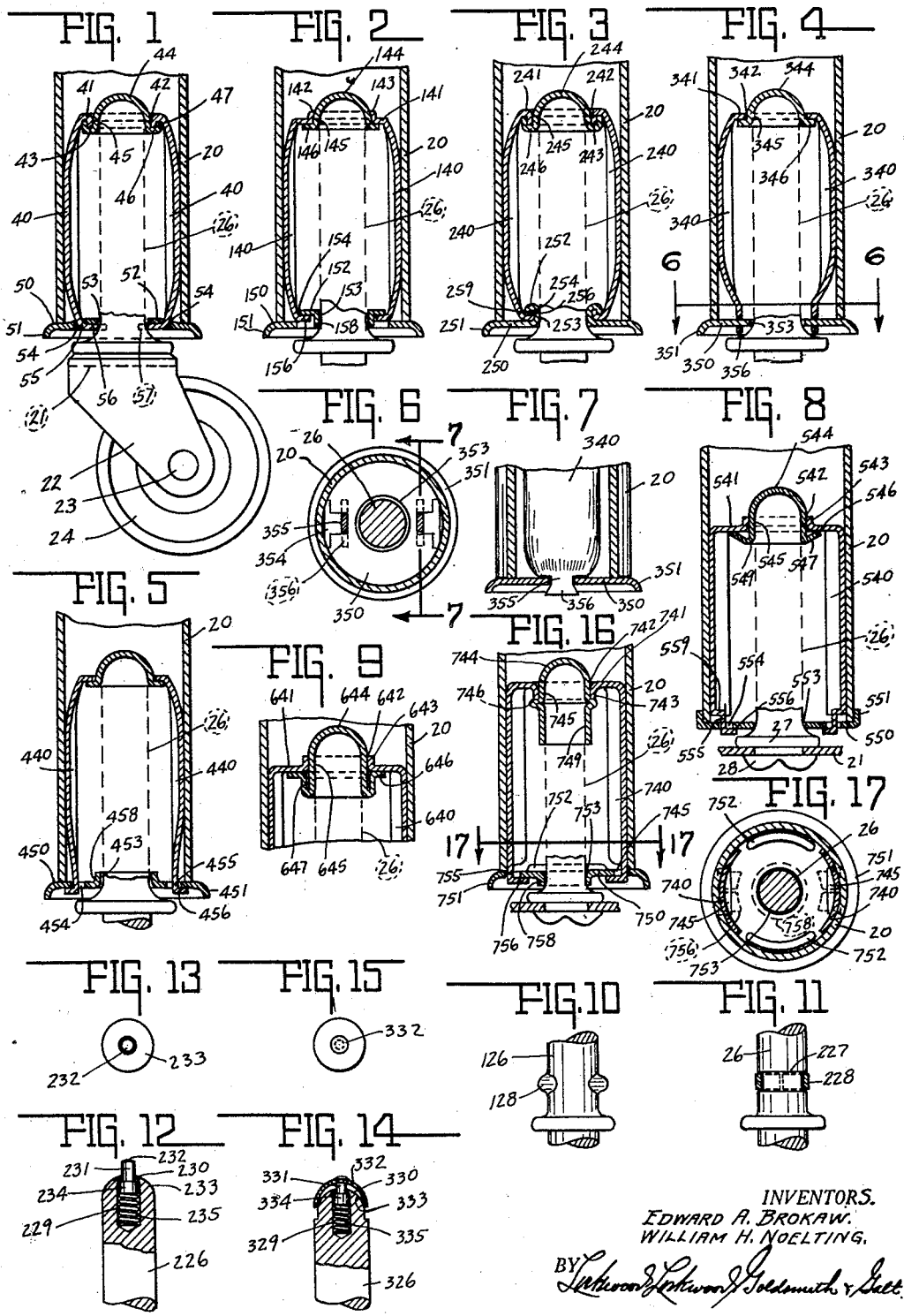
INVENTORS.
EDWARD A. BROKAW.
WILLIAM H. NOELTING.
BY
ATTORNEYS.

Patented May 3, 1932

1,856,535

UNITED STATES PATENT OFFICE

EDWARD A. BROKAW AND WILLIAM H. NOELTING, OF EVANSVILLE, INDIANA, ASSIGNORS TO FAULTLESS CASTER COMPANY, OF EVANSVILLE, INDIANA, A CORPORATION

CASTER STEM AND SOCKET

Application filed November 15, 1929. Serial No. 407,312.

The invention relates to a caster construction including the socket and stem.

The chief object of the invention is to provide a relatively non-cocking stem supporting socket adapted to support a tubular leg and arranged such that clicking of the stem in the socket is substantially eliminated whether the stem be permanently or detachably mounted in the socket.

The chief feature of the invention consists in first, the particular construction of the frame comprising the socket, whereby a top bearing is obtained, and second, the non-clicking end of the stem head associated therewith.

The full nature of the invention will be understood from the accompanying drawings and the following description and claims:

Fig. 1 is a central sectional view through a tubular leg and caster socket, the caster being shown in elevation. Fig. 2 is a similar view of a modified form, parts of the caster being omitted. Fig. 3 is a similar view of a further modified form. Figs. 4 and 5 are similar views and illustrate further modified forms of the invention. Fig. 6 is a transverse sectional view taken on the line 6—6 of Fig. 4 and in the direction of the arrows. Fig. 7 is an off-center longitudinal section taken on the line 7—7 of Fig. 6 and in the direction of the arrows. Fig. 8 is a view similar to Figs. 2 to 5, inclusive, and of a modified form of the invention. Fig. 9 is a similar view of a modified form thereof. Fig. 10 is an elevational view of one form of stem portion provided with relatively permanent connecting means. Fig. 11 is a similar view of a modified form illustrating one form of detachable connection. Fig. 12 is an end elevation with parts in central section to show the same and other parts in detail and of the head of the end of the stem showing the anti-clicking construction. Fig. 13 is a top plan view thereof. Fig. 14 is a view similar to Fig. 12 and of a modified form of the anti-clicking invention. Fig. 15 is a top plan view thereof.

Fig. 16 is a central sectional view of a modified form of the invention and constitutes the preferred form.

Fig. 17 is a transverse sectional view taken on line 17—17 of Fig. 16 in the direction of the arrows.

In the drawings, 20 indicates a tubular leg, which is supported by a load supporting plate in turn supporting a stem receiving frame comprising an inverted U-shaped spring frame, the central portion of which is apertured to receive a cup construction providing a top bearing for a caster stem. The caster stem extends through a central opening in said supporting plate and is secured to a horn 21, the ends of which are turned angularly to form parallel ears 22 that support a pivot 23 rotatably mounting a caster roller 24.

The stem, indicated generally by the numeral 26, includes an enlargement 27 adjacent its lower end and an enlargement 28 in spaced relation therewith between which is mounted the horn 21, see Fig. 8. The stem may be detachably associated with the socket and one form of detachable connection is illustrated in Fig. 11 wherein the stem is grooved as at 227 to receive a split outwardly expansible stem retaining ring 228, the same being compressible into nested relation within the groove to permit passage of the stem through the central stem receiving opening in the load supporting plate. Other equivalent forms of detachable anchorage may be provided as is well known in the art.

One form of permanent stem and socket connection is illustrated in Fig. 10 wherein stem 126 is provided with one or more lateral enlargements 128, struck therefrom, said enlargements being spaced above the upper horn plate anchoring portion. When mounted in the socket said enlargements lie immediately above the load supporting plate.

The position of the ring 228 or the enlargements 128, relative to the horn plate anchoring portion is such that limited axial movement of the stem relative to the load supporting plate is permitted but such movement is not sufficient to permit lateral escapement of the upper end of the stem from the laterally centering and top bearing cap.

The caster stem, particularly in movement over an uneven floor or off and onto rugs, does not have its end constantly in contact with the cap so that the usual top bearing caster construction permits a clicking in the movement of the caster supported article, the same being the result of the intermittent contact of the end of the stem with the cap. When the caster is mounted in the hollow of a leg, particularly a tubular metal leg, such as illustrated herein and which is general practice in the washing machine trade, this clicking sound is intensified and resonated and is exceedingly objectionable.

Accordingly, an anti-clicking construction is provided and interposed between the end of the caster stem and the supporting top bearing, so that the end of the stem or a portion supported thereby, will always be in contact with the top bearing cap or a portion supported thereby.

Two modified forms of anti-clicking constructions are illustrated in Figs. 12 to 15 inclusive, and both herein are shown supported by the stem.

In Figs. 12 and 13, the stem 226 is shown coaxially recessed as at 229, said recess terminating at the head of the stem and including an inturned retaining collar portion 230. Slidable in said recess is a plunger 231 of a diameter slightly less than that of the retaining collar portion 230. The end 232 of the plunger is preferably formed as a portion of the surface of the sphere so that when the plunger is fully retracted and seated in the socket, said partial spherical surface forms a continuation of the partial spherical or hemi-spherical head of the stem, same being indicated at 233 and Figs. 12 and 13. The plunger 231 within the recess is enlarged and includes a head portion 234 which bears upon the recess enclosed spring 235 which normally projects the plunger outwardly and maintains the same in constant engagement with the cap when the stem is associated with the socket.

Figs. 14 and 15 illustrate a modified form of anti-rattling construction. Stem 326 includes the coaxial bore 329, which is reduced by the retaining collar forming portion 330 in turn retaining the plunger 331 against complete separation by retaining the recessed receivable head portion 334 which bears against the recess enclosed spring 335. Spring 335 normally projects the plunger outwardly to maintain constant engagement between the cap and stem when the stem is associated with the socket.

In this form of the invention the hemispherical end 333 of the stem is reduced and a hemi-spherical shell 332 is carried by the end of the plunger 331. Said shell is telescopically associated with the end of the stem and maybe hardened or the like.

In Figs. 1 to 9 and Figs. 16 and 17, there are illustrated various forms of sockets with which the caster stem constructions illustrated in Figs. 10 to 15 may be associated. In all of these forms of the invention the inverted U-shaped spring frame has its side or arm portion curved in transverse section so that a somewhat cylindrical approximation is obtained. In several of the figures it will be apparent that at the top and bottom of the socket construction the spring frame members are bowed inwardly so that there results a somewhat barrel shaped approximation.

In Fig. 1 the inverted U-shaped strap construction is of barrel type and the arms thereof are indicated by the numeral 40. The central arm connecting top portion 41 is provided with a central opening 42. The portion immediately surrounding said opening is turned downwardly and into the socket chamber and forms a collar 43. Mounted in the central opening 42 is a cap having the hemi-spherical head portion 44 and cylindrical body portion 45, the former projecting above the plane of the arm connecting portion 41 and the latter being concentrically mounted within the opening 42 and the cylindrical collar 43 defining the same.

The cap 44 includes a lateral portion 46 that bears upon the end of the collar portion 43. The lateral portion 46 herein serves as a stop and prevents axial separation of the cap and arm connecting portion of the socket, and is also turned back to form a groove 47 with the cylindrical portion 45 and into which the collar portion 42 projects.

The load sustaining plate 50 is provided with the down turned flange or skirt 51, although the latter may, if desired, be omitted. This skirt however, increases the strength of the plate. The central portion of the plate 50 is raised or embossed as at 52 and centrally apertured as at 53 for receiving stem 26. At the merger between the plate 50 and the embossment 52, a pair of diametrically positioned apertures 54, is provided. The laterally reduced ends 55 of the arms extend through said apertures, turned inwardly as at 56 and terminate short of stem engagement but may, if desired, partially embrace said stem, as indicated at 57.

In Fig. 2, the cap and arm connecting portions are illustrated in a simplified form. The inverted U-shaped spring socket forming arms 140 are shown barrel shaped and are connected at their upper ends by the plate portion 141, the latter being centrally apertured as at 142 and herein the aperture defining collar portion 143 is extended upwardly instead of downwardly, as shown in Fig. 1. The cap 144 of hemi-spherical formation is mounted in the aperture and collar by the cylindrical portion 145 and the lateral extension 146 thereof prevents axial separation of the cap and socket as before set forth.

In this form of the invention, the load sustaining plate 150 includes the down turned reinforcing ornamental skirt flange 151. The central portion of said plate is embossed or offset as at 152 and centrally apertured as at 153 to receive the stem 26. The aperture is defined by down turned collar 158. The intermediate portion connecting the plate and the embossed central portion is diametrically slotted as at 154, and extending through the slots and in a plane intermediate planes of the embossment and the plate, are the inturned arms anchoring portions 156, which if desired, may partially embrace the collar portion 154 as illustrated at 57 in Fig. 1.

It will be apparent, therefore, that the plate and frame connection shown in Fig. 1 may be employed with the cap and frame connection shown in Fig. 2 or vice versa. The same interchangeability may be obtained with any of the subsequently described plate and frame, and cap and frame connections to form a complete socket.

In Fig. 3, the cap and frame connection is substantially identical to that illustrated in Fig. 1 and similar numerals of the 200 series indicate like parts, thus 240 the spring frame arms, 241 the centrally connecting portion, 242 the central aperture therein, 243 the aperture defining collar, 244 the hemi-spherical portion of the cap, 245 the cylindrical portion mounted within the aperture and collar, 246 the lateral cap limiting portion and 247 the groove forming portion receiving the collar 243.

The lower ends of the arms are secured to the load supporting plate 250 provided with the down turned ornamental and reinforcing flange 251. The plate 250, centrally apertured as at 253 and provided with a collar portion 254, extends upwardly therefrom, thence outwardly as at 252 and thence downwardly as at 259, forming a groove that receives the upturned ends 256 of the inturned portions 255 of the arms 240.

In Figs. 1 and 3, the spring frame is adjustable to tubular leg diameter by lateral elongation, while Fig. 2 illustrates a form wherein tubular leg adjustment is obtained by lateral extension of the arms and not necessarily by axially elongation thereof, as required by the forms illustrated in Figs. 1 and 3.

In Fig. 4, the simplest form of cap and frame connection is illustrated and the arms 340 are connected by the top portion 341, centrally apertured at 342 to receive the cap comprising the hemi-spherical portion 344 and the cylindrical portion 345. The cap is retained in the socket frame against axial displacement by the lateral portion 346.

A different type of plate and frame connection, to wit, a detachable type which, in addition thereto, is adjustable to the tubular leg by lateral enlargement only and is illustrated in Figs. 4, 6 and 7. In these figures plate 350 is provided with the downturned skirt 351. Each of the barrel arms 340, includes a reduced lower portion 355, receivable by a T-shaped slot 354, two thereof being provided and diametrically positioned, see Fig. 6. The reduced portion 355 is enlarged as at 356 and serves as a retaining portion. a T-shaped enlargement may be substituted for the wedge shape illustrated. The plate 350 is provided with a central aperture 353 that receives stem 26.

In this form of the invention, the spring frame is detachably associated with the load supporting plate by the enlarged portion 356, passing through the laterally enlarged portion or head of the T-shaped slot. The spring arms then are compressed towards each other until the lateral enlargements underlie the plate portion adjacent the main portion of each slot to lock the plate and arms together.

A modified form of plate and frame anchorage is illustrated in Fig. 5. The plate 450 is skirted as at 451 and is centrally apertured as at 453, said aperture being defined by the upwardly directed collar 458. The barrel shaped frame arms 440 extend inwardly and a laterally reduced portion 455 of each extends vertically through one of a pair of a diametrically positioned radially elongated slots 454 in plate 450. The lower free ends of said arms are turned laterally and outwardly as at 456 and permanently unite the frame to the plate. Adjustment of the socket to the tube 20 is obtained by the arms moving towards and away from each other in the radially elongated slots 454.

In Fig. 8, the spring frame arm construction 450 is substantially cylindrical in outline. The top portion 541, connecting the upper ends of said arms, is centrally apertured as at 542, the aperture being defined by an upturned collar 543. The hemi-spherical cap 544 includes this cylindrical portion 545, positioned within the aperture and collar. Said cap extends an appreciable distance, see 549, into the chamber formed within the spring frame and then is turned back outwardly and upwardly into a conical formation 547, the edge 546 of which bears upon the top portion 541 and prevents axial separation of the cap and frame.

The plate 550 in this form of the invention is provided with an upturned leg mount 551, telescopically receiving the end of the tubular leg 220. The plate 550 is provided with radially elongated diametrically positioned apertures 554, through which reduced vertical extensions 555 of the arm extend and then are turned laterally and inwardly as at 556 to lock the frame and plate together. The plate includes the central aperture 553. Herein the cylindrical formation is reduced to a strap formation 555 at the laterally offset portion 559 positioned parallel to and immediately above the plate 550.

Fig. 9 illustrates a modified form of cap and frame connection wherein the frame arms 640 are connected at their upper ends by the plate portion 641 centrally apertured at 642, said aperture being defined by the upwardly extending collar portion 643. Mounted therein, is the hemi-spherical cap 644 including the cylindrical portion 645, which extends into the chamber formed within the spring frame arms an appreciable distance. The cap is turned back upon itself as at 647 and the enveloping tubular construction 647 preferably is provided with an outwardly and laterally directed flange 646, which bears upon the top 641 and prevents axial separation of the cap and frame.

In Figs. 16 and 17 the preferred form of the invention is illustrated. The arms 740 are shown cylindrical although they may be barrel-shaped. The upper ends of the arms are connected by the plate portion 741, centrally apertured at 742 and defined by a downwardly directed collar 743 and retains the cap against axial separation from the frame. The cylindrical portion 745 is elongated as at 749, and projects inwardly a considerable distance into the chamber included within the frame arms.

The plate 750, see Figs. 16 and 17, is provided with a down-turned skirt 751 and is centrally apertured as at 743, said aperture being defined by downwardly directed collar 758. The plate is provided with a pair of radially elongated slots 745, each of which receives a vertically directed extension 755 of the cylindrically shaped spring arms and said extensions are turned laterally and inwardly as at 756.

As shown clearly in Fig. 17, the plate 750 is provided with a pair of arcuate embossments 752, which serve as reinforcements and also serve as a leg centering device for the portions between the two arms of the socket. The adjustment of the socket to the tube is obtained through lateral displacement of the arms in the radially elongated slots provided in the load supporting plate.

While the invention has been described in great detail in the foregoing specification, and various modifications thereof have been described herein, as well as illustrated in the drawings, said modifications, as well as those which will readily suggest themselves to persons skilled in the art, all are considered to be within the broad purview of this invention, reference being had to the appended claims.

The invention claimed is:

1. In a caster construction, a supporting frame including a horizontally disposed plate having an aperture, a collar integral with and projecting beyond said plate and surrounding said aperture, a tubular cap having a closed end, said cap having its lower open end extending through said aperture and adapted to receive and snugly embrace the upper portion of a caster pintle, and an outwardly directed portion on said cap disposed an appreciable distance from the ends thereof interengaging with said collar to limit the movement of said cap in said aperture.

2. In a caster construction, a supporting frame including a horizontally disposed plate having an aperture, a collar integral with and projecting beyond said plate and surrounding said aperture, an elongated tubular cap having a closed upper end, said cap having its lower open end projecting through said aperture and disposed an appreciable distance below said plate to snugly embrace the upper portion of a caster pintle, and an outwardly directed annular portion integral with said cap disposed an appreciable distance from the ends of the latter to interengage throughout its circumference with said collar to limit the movement of the cap in said aperture.

In witness whereof, we have hereunto affixed our signatures.

EDWARD A. BROKAW.
WILLIAM H. NOELTING.